US012693096B2

(12) United States Patent
Knezevic et al.

(10) Patent No.: US 12,693,096 B2
(45) Date of Patent: Jul. 28, 2026

(54) AIR DEFENSE SYSTEM FOR ANTI-AIRCRAFT COMBAT COMPRIZING COUNTER COUNTER MEASURES DEVICE TO TRIGGER THE COUNTER MEASURE OF THE AIRCRAFT PRIOR LAUNCHING ANTI-AIRCRAFT MISSILE AT THE AIRCRAFT

(71) Applicant: CARBOTEH TECHNOLOGIES D.O.O., Ljubljana (SI)

(72) Inventors: Srecko Knezevic, Ljubljana (SI); Primoz Peterca, Ljubljana (SI); Radovan Sernec, Ljubljana (SI); Luka Zupancic, Ljubljana (SI)

(73) Assignee: CARBOTEH TECHNOLOGIES D.O.O., Ljubljana (SI)

( * ) Notice: Subject to any disclaimer, the term of this patent is extended or adjusted under 35 U.S.C. 154(b) by 0 days.

(21) Appl. No.: 18/871,149

(22) PCT Filed: Jun. 2, 2022

(86) PCT No.: PCT/SI2022/050018

§ 371 (c)(1),
(2) Date: Dec. 2, 2024

(87) PCT Pub. No.: WO2023/234873

PCT Pub. Date: Dec. 7, 2023

(65) Prior Publication Data

US 2025/0354782 A1 Nov. 20, 2025

(51) Int. Cl.
*F41G 7/22* (2006.01)
*F41G 7/00* (2006.01)
(Continued)

(52) U.S. Cl.
CPC ............ *F41G 7/224* (2013.01); *F41G 7/004* (2013.01); *F41G 7/007* (2013.01); *F41H 11/02* (2013.01); *H04K 3/20* (2013.01)

(58) Field of Classification Search
CPC ... F41H 11/02; F41G 7/00; F41G 7/22; G01S 7/495
See application file for complete search history.

(56) References Cited

U.S. PATENT DOCUMENTS 8,082,832 B1 12/2011 Tidwell
10,567,106 B2 2/2020 Thum-Jaeger
(Continued)

*Primary Examiner* — J. Woodrow Eldred
(74) *Attorney, Agent, or Firm* — The Watson IP Group; Jovan N. Jovanovic

(57) ABSTRACT

The invention refers to an air defense system comprising at least one counter countermeasures device, and at least one anti-aircraft weapon system and to an anti-aircraft combat method comprising said air defense system. The counter countermeasures device is configured for generating and emitting electromagnetic radiation of appropriate wavelengths, i.e. simulated missiles, that mimic real anti-aircraft missiles, and, in this way, the anti-aircraft missile launch warning and detection system (MLWDS) installed on aircrafts are deceived and the countermeasures are released. The operation of the counter countermeasures device and of the anti-aircraft weapon system, i.e. emitting of simulated missiles and launching of anti-aircraft missiles, is coordinated. The counter countermeasures device is implemented as a standalone device or is attached to or is integrated into the anti-aircraft weapon system. With the proposed air defense system and method, the efficiency of the anti-aircraft combat is highly improved, i.e. the probability of the target hit is highly improved.

18 Claims, 4 Drawing Sheets

Figure 1:
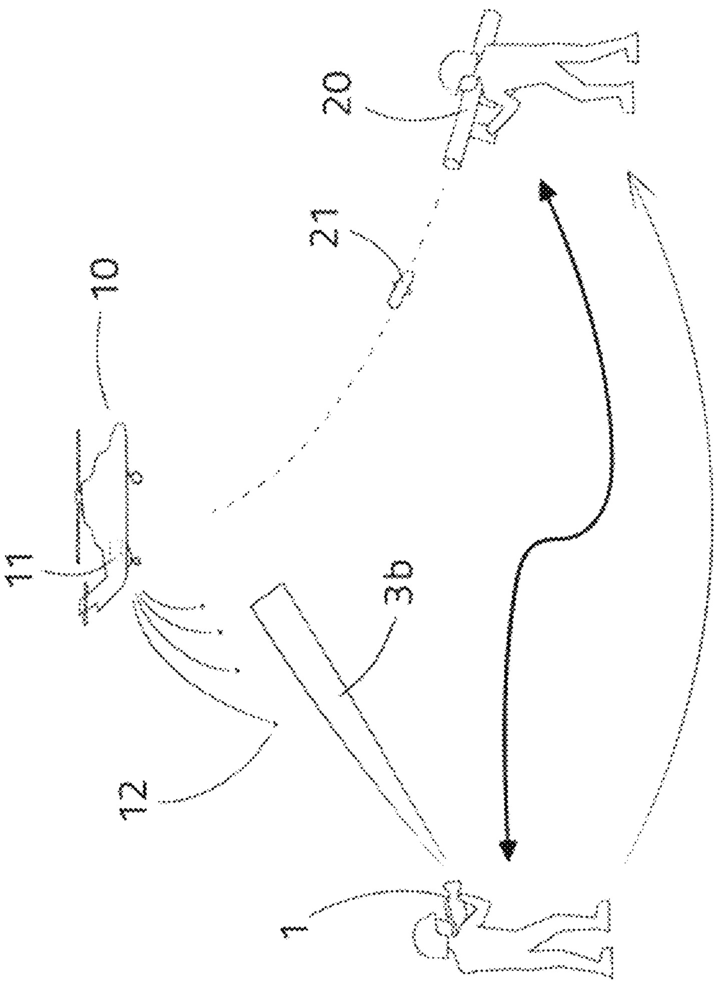

(51) Int. Cl.
*F41H 11/02* (2006.01)
*H04K 3/00* (2006.01)

(56) References Cited

U.S. PATENT DOCUMENTS

| | | | | |
|---|---|---|---|---|
| 2005/0001755 | A1 * | 1/2005 | Steadman | G01S 13/86<br>342/14 |
| 2010/0209880 | A1 * | 8/2010 | Leonard | F41G 7/006<br>434/14 |
| 2014/0096669 | A1 * | 4/2014 | Gaska | F41J 9/08<br>89/1.11 |
| 2018/0293909 | A1 * | 10/2018 | Lechner | G09B 9/006 |

* cited by examiner

AIR DEFENSE SYSTEM FOR ANTI-AIRCRAFT COMBAT COMPRIZING COUNTER COUNTER MEASURES DEVICE TO TRIGGER THE COUNTER MEASURE OF THE AIRCRAFT PRIOR LAUNCHING ANTI-AIRCRAFT MISSILE AT THE AIRCRAFT

The invention refers to an air defense system comprising at least one counter countermeasures device, hereinafter referred to as CCM device, and at least one anti-aircraft weapon system and to an anti-aircraft combat method comprising said air defense system. By the proposed system and method, i.e. by the use of the CCM device in conjunction with a real anti-aircraft missile launcher, the efficiency of the anti-aircraft combat is highly improved, i.e. the probability of the target or the aircraft hit is highly improved.

In the context of this application "aircraft" is referring to any device or machine capable of atmospheric flight, such as airplane, helicopter, unmanned aerial vehicles, drone, cruise missile with installed anti-aircraft missile warning and detection system.

CCM device is capable of generating and emitting electromagnetic radiation of appropriate wavelengths, i.e. simulated missiles, that mimic real anti-aircraft missiles, and, in this way, the anti-aircraft missile launch warning and detection system (MLWDS) installed on aircrafts are deceived, wherein an alarm is triggered by which the countermeasures-release device automatically, semi-automatically or by means of a pilot, releases the countermeasures, for example flares or directional infrared countermeasures. In case the countermeasure is implemented as a flare it is important that the number of flares carried by the aircraft is limited, so after all flares are released, for example by simulated missiles, the aircraft is basically defense-less against real anti-aircraft missiles and thus real anti-aircraft missiles can be launched. In case of directional infrared countermeasures, the countermeasures-release device usually can handle only one anti-aircraft missile, wherein handling in this context means interfering or obscuring and thus distracting the anti-aircraft missile guidance. Thus, if a real anti-aircraft missile is simultaneously launched together with the simulated missiles, the probability of hitting the target with a real anti-aircraft missile is greatly improved.

Various anti-aircraft missile simulation systems have been developed for ground-based and airborne launch applications, particularly for testing and/or calibration purposes of sensors operations on the aircraft, i.e. anti-aircraft missile launch warning and detection systems.

In patent document U.S. Pat. No. 10,288,234B1 a handheld UV light stimulator is disclosed intended to operate in UV spectrum and for test purposes of sensors operations on the aircraft, specifically to achieve lightweight handheld operation and mobility.

In patent document U.S. Pat. No. 5,693,951 a missile launch and flyout simulator is disclosed intended to operation in UV and IR spectrum and for triggering the missile warning on aircraft and is also designed for mobile and remotely triggered operation, however, said simulator is largely based on analog electronics and focuses on design of source and missile plume signature.

In patent document U.S. Pat. No. 7,528,396 a solid state simulator of missile UV signatures is disclosed for test and training purposes with the use of solid state UV sources. In patent document U.S. Pat. No. 8,185,350B2 a verification of a missile approach warning system is disclosed intended to operation in UV and IR spectrum and for test and calibration purposes of sensors operations on aircraft, specifically to achieve firm direct attachment to sensors on aircraft or other systems.

In patent document US20080169423A1 a test apparatus for testing the operability of a warning system for approaching guided missiles is disclosed intended to operation in UV spectrum and for test purposes of sensors operations on aircraft, specifically to achieve mobility.

In patent document U.S. Pat. No. 10,598,468B2 a system for simulation of missile signatures is disclosed for simulating missile plumes in UV and IR regions and details the wave generation with LED, focusing on a device. However, there is no description of a particular usage and/or an integration embodiment of the sources themselves.

In patent document U.S. Pat. No. 9,791,558B2 a two-color signature simulation IR sources test with lasers is disclosed intended to operation in IR spectrum with laser sources and for test purposes of sensors operations on aircraft, specifically to achieve low cost of sensor testing at multiple IR wavelength within a single system.

The disclosed systems are not designed to be part of the handheld anti-aircraft weapon or anti-aircraft weapon systems and to be intended to be used in combat situations. Further, in prior art documents also no human or automatic coordination of the proposed systems with the real missile system, is disclosed.

The applicant is not aware of known systems which would combine missile simulation devices with anti-aircraft weapon systems.

The main purpose of this invention is to overcome these drawbacks by providing an air defense system and an anti-aircraft combat method comprising said system to be used in real combat situations.

Figure 2:
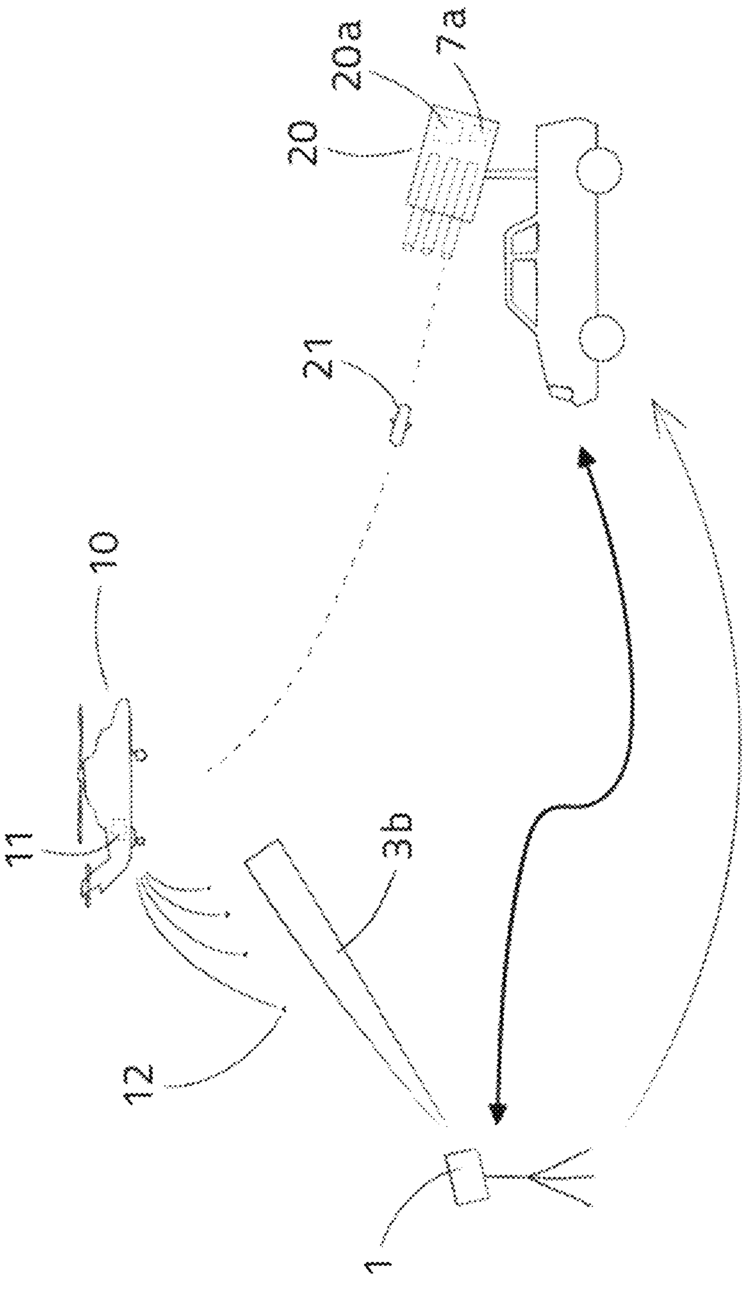
Figure 3:
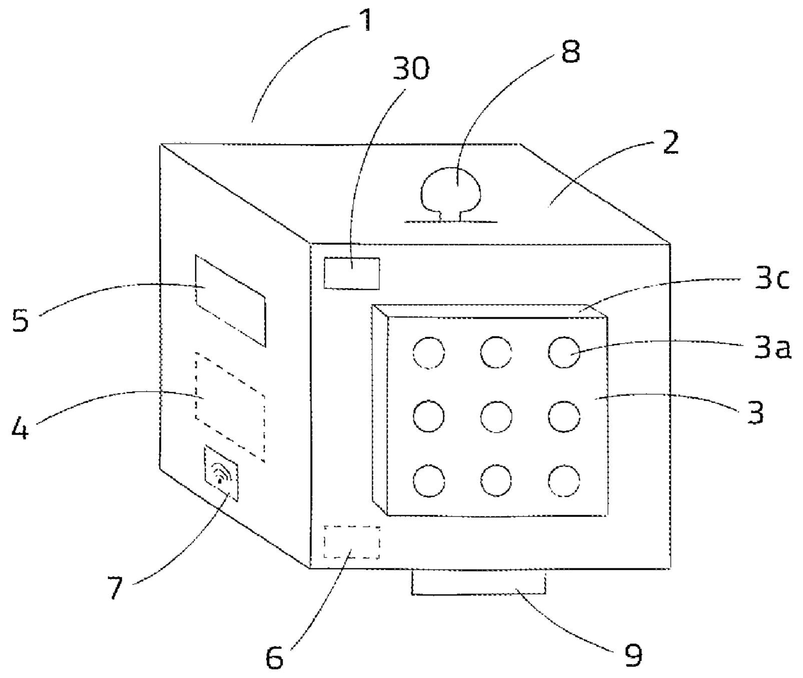
Figure 4:
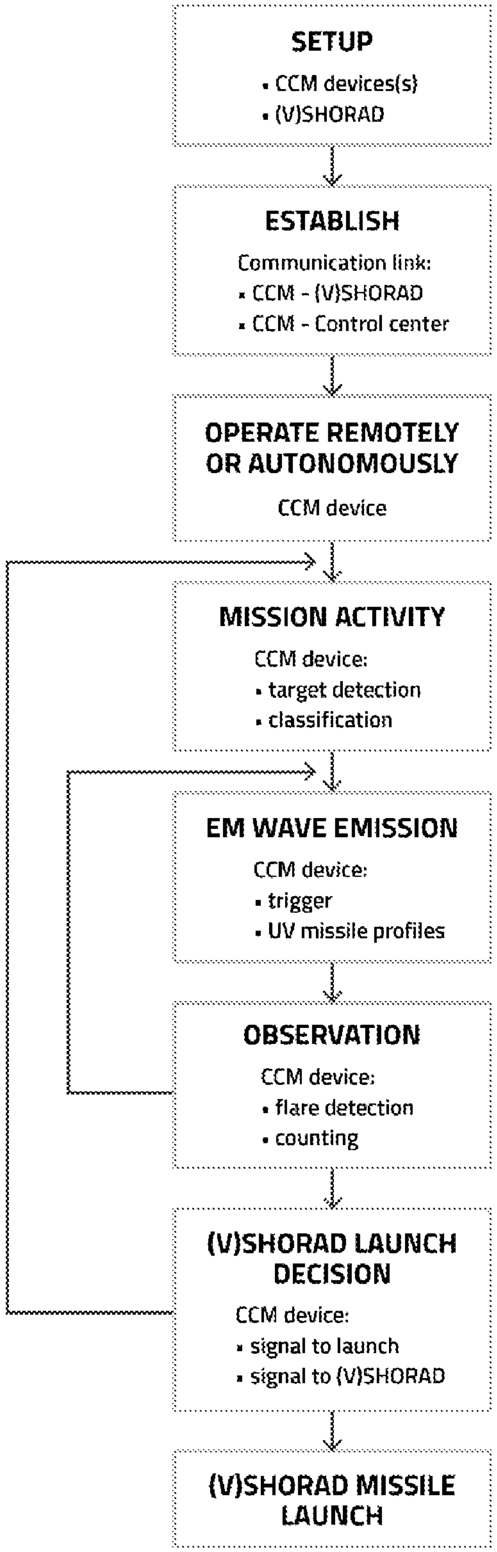

The invention is further described in detail below and presented in figures, where:

FIG. 1 schematically presents one embodiment of the system of the invention in operation FIG. 2 schematically presents another embodiment of the system of the invention in operation FIG. 3 schematically presents one embodiment of the CCM device FIG. 4 is a flow chart of the air defense system operation and method An air defense system of the invention is comprised of:

- at least one CCM device 1 configured for generating and emitting electromagnetic radiation (EM radiation), i.e. simulated missile(s), of wavelengths that mimic real anti-aircraft missiles 21, that is, **3*b* which are detected by an anti-aircraft missile warning and detection system 11 installed on an aircraft 10 and a corresponding alarm on the anti-aircraft missile warning and detection system 11** is triggered;
- at least one anti-aircraft weapon system 20 configured for launching at least one anti-aircraft missile 21 and
- wherein emitting of simulated missiles **3*b* and launching of anti-aircraft missiles 21** are coordinated.

A CCM device 1, presented on FIG. 3, is comprised of a source unit 3 of electromagnetic radiation (hereinafter referred to as the EM source unit 3), an electronic control circuit 4 with processing, memory, and EM source unit 3 driving capabilities, a trigger unit 5, and a power unit 6.

The EM source unit 3 is configured for emitting simulated missiles **3*b* or sequences thereof, i.e. emitting light of certain wavelengths, and comprises at least one EM source 3*a* emitting light of a certain wavelength. Preferably, the EM source unit 3 comprises multiple EM sources 3*a* emitting light of the same wavelength or emitting light of different wavelengths operating simultaneously and/or with a time shifted difference. Preferably, EM sources 3***a* are arranged in arrays, wherein each individual array emitting light of the same wavelength or emitting light of different wavelengths.

Preferably the EM source unit 3 is configured for emitting UV light in solar blind region, usually <300 nm, and/or IR light in short wave region (SWIR), usually 0.7 μm-3 μm or medium wave region (MWIR), usually 3 μm-12 μm, and/or laser light in IR region, usually in SWIR region, or UV light in solar blind region (<300 nm). The EM radiation can be suitably collimated with one or several known methods, e.g. lens, reflective parabola or a combination thereof, to achieve higher photon flux per unit area (irradiance) and/or flux per solid angle (intensity) and/or flux per unit area per unit solid angle (radiance) in a required direction, i.e. the direction toward target.

The CCM device 1 has capability to generate and emit in either one, a combination of two or all three types simultaneously.

Each simulated missile 3*b* is defined by a profile or signature (hereinafter referred as a profile), which comprises duration, wavelength and intensity of EM radiation emitted by each individual EM source 3*a*, the purpose of which is triggering MLWDS 11 to release countermeasures 12, e.g. flares or directional infrared countermeasures.

Namely, it is desirable that the profile of a simulated missile 3*b* is such that satisfactory mimicking of the anti-aircraft missile 21, i.e. missile rocket motor activity, of its fume compositions exhaust or of its emitted heat, is achieved, so that the anti-aircraft missile warning and detection systems 11 installed on aircrafts 10 recognizes it as a real missile 21 and triggers the appropriate alarm.

In a preferred embodiment, the EM source unit 3 is configured for emitting UV light in solar blind region and is implemented as an array of individual EM sources 3*a* implemented as UV LEDs in combination with collimation system composed of a single large lens or multiple large lenses that cover the whole area of the UV LEDs array, or a lens is dedicated to a single UV LED or several of them. A combination of both is also possible.

The UV LED array and lens is protected with protective glass.

All lens and protective glass are suitably transparent (e.g. at least 90% transparent) to wavelengths emitted by EM sources 3*a*, in mentioned case UV in solar blind region.

The EM source unit 3 is placed in a casing 3*c* of metallic construction, usually Aluminum or other materials, e.g. PTFE or temperature and UV resistant materials.

A set of gaskets is situated between UV LEDs, lens, protective cover glass to assure full resistance to dust and water, e.g. to IP65 level. Such solution is crucial for field operation in harsh environments.

The trigger unit 5 is configured for selecting the profile of the simulated missile 3*b* or a sequence thereof, and for activating the CCM device 1, including triggering of emitting the simulated missiles 3*b*. Trigger unit 5 may be implemented as a switch, switch with safety cover or button or button with safety cover. To achieve multifunctionality of the trigger unit 5, the trigger unit 5 may be implemented with several buttons or switches or for example as electro-mechanical multi positional trigger. Due to operation in harsh environments and to prevent unwanted triggering, it is possible to implement the trigger unit 5 also with safety cover as an integrated assembly, so called toggle switch safety cover.

In a memory which is part of the electronic control circuit 4 at least one profile of the simulated missile 3*b* is stored. Preferably, several profiles of the simulated missile 3*b* are stored in the memory, whereby each profile of the simulated missile 3*b* is specific to one type of known anti-aircraft missiles 21 or to a generic type with generally similar profile characteristic. In the memory also the sequences of profiles of simulated missiles 3*b* can be stored.

Known anti-aircraft missiles 21 are for example missiles 21 on MANPADS (Man-portable Air-Defense System), VSHORAD (Very Short Range Air Defense) and SHORAD (Short Range Air Defense) systems. The advantage of several profiles of the simulated missile 3*b* stored in a memory is, that different profiles or the sequences of different profiles are emitted which mimic different anti-aircraft missiles 21, thus the deception of the anti-aircraft missile warning and detection systems 11 is greatly improved.

The electronic control circuit 4 is configured for driving the EM source unit 3, for storing the profiles of simulated missiles 3*b* and sequences thereof, for receiving an input from the trigger unit 5 and for running the CCM software module which operates the CCM device 1.

In one embodiment, the electronic control circuit 4 has connection means 7 for enabling cable or wireless connection between the electronic control circuit 4 and other electronic devices, such as for example an external computer for programming the electronic control circuit 4, including uploading, modifying, and updating the profiles of simulated missiles 3*b*. In this manner such CCM device 1 can be adapted to operate for longer lifetimes and be current with newly developed missile profiles.

Cable connection is achieved for example by USB standard, wireless connection is achieved for example by Bluetooth standard, Wi-Fi standard or combination thereof.

Preferably, the communication through the connection means 7 is encrypted for safe communication.

The profiles of simulated missiles 3*b* to be generated and emitted can be selected manually or automatically. The selection is done by the trigger unit 5. In automatic mode the profiles can be automatically selected from the memory: one same profile or two or more same or different profiles on rotating basis, sequentially or random. Random selection is preferred since it aids in successful deception of MLWDS 11. Further advantage of random selection is, since aircrafts 10 may have more sophisticated MLWDS 11 which can recognize the profile of the simulated missile 3*b* as a fake missile, by randomly emitting different profiles the chances that MLWDS 11 will not recognize the simulated missile 3*b* profile as a fake missile are greatly improved.

The CCM device 1 is placed into enclosure 2, that is suitably water and dust protected and/or sealed, and rugged for out-door operation and military like handling to withstand also operation in wide temperature range, e.g. −30 degrees C. to +50 degrees C.

Power supply unit 6 consists of suitable battery or a set of batteries known from the state of the art and is for example implemented as lithium-ion type with control electronics to prevent over discharging and monitor state of charge of batteries.

In one embodiment, the CCM device 1 additionally comprises a mechanical or optical sight 8 installed on top or side position of the enclosure 2, such that a soldier can observe and aim towards the aircraft 10, i.e. the target. Additional optical zoom, optical magnification can be included, as well as a night vision or IR vision sight or optical scope.

In one embodiment, CCM device 1 additionally comprises an attachment harness 9 for attachment of the device onto the anti-aircraft weapon systems 20, i.e. on their weapons or launching tubes. Preferably, the attachment harness 9 is standardized rail, e.g. Picatinny or clamp to facilitate straightforward attachment.

Suitable anti-aircraft weapon systems 20 with embedded weapon electronic circuit 20*a* are for example MANPADS (Man-portable Air-Defense System), VSHORAD (Very Short Range Air Defense), SHORAD (Short Range Air Defense) based on anti-aircraft surface-to-air or ship-to-air missiles or high rate of fire anti-aircraft guns, remote controlled unmanned ground or aerial vehicles or surface and ship vehicles (UGV, UAV, drones in general) equipped with anti-aircraft missiles 21, or remote weapon stations (RWS) equipped with anti-aircraft missiles 21 and installed on 4×4, 6×6, 8×8 or special purpose military vehicle or on ships and drones.

In one embodiment, the anti-aircraft weapon system 20 may comprise also a weapon connection means 7*a* configured for connecting the weapon electronic circuit 20*a* with the electronic control circuit 4 on the CCM device 1.

In one embodiment, the air defense system can include a sensor subsystem 30 for detecting and acquiring information about the aircraft 10, for example the aircraft 10 distance, elevation, azimuth, velocity, aircraft 10 type (e.g. helicopter, jet) and model (e.g. MIL-17, F-16).

In one embodiment, said sensor subsystem 30 is also configured for detecting, analyzing, and recording or counting the ejected flares 12, and thus for providing feedback on performance, and optionally for providing information when to launch the real missiles 21.

In one embodiment, said sensor subsystem 30 is also configured for sensing of IR lasers emitted from directional infrared countermeasures systems on the aircraft 10.

In this way the decision-making process when to trigger the anti-aircraft missile 21 is significantly enhanced, since for example based on known aircraft 10 model and type, particular aircraft countermeasures 12 are determined, and appropriate profiles and sequence of simulated missiles 3*b* is selected in combination with the anti-aircraft missile 21. For example, based on known aircraft 10 model, the types and number of flares 12 are determined, thereby a more accurate prediction weather all flares 12 are already exhausted is enabled.

The sensor subsystem 30 is comprised of sensors, such as for example VIS, IR camera, radar, and of an integrated computer with connectivity capabilities for connection with the electronic control circuit 4 through the connection means 7. The electronic control circuit 4 and/or integrated computer is configured for extracting relevant information from the sensor data such as distance, elevation, azimuth, velocity, the aircraft type, and model.

Preferably, the sensor subsystem 30 is located on the CCM device 1.

During operation the CCM device 1 may be located essentially on the same geographical location as the anti-aircraft weapon system 20, for example the CCM device 1 is attached to or is integrated into the anti-aircraft weapon system 20, or the CCM device 1 is on different geographical location. In an embodiment when the CCM device 1 is on different geographical location, and since during operation, the CCM device 1 does not emit visible traces, like rocket motor fumes or trails that could be visually detected from the remote aircraft 10, the probability of disabling the CCM device 1 is reduced or prevented. On the other hand, the location of the anti-aircraft weapon systems 20 can be detected from the remote aircraft 10 and consequently the possibility of remote targeting and incapacitation/disabling of the collocated CCM device 1, is thus increased.

Triggering sequence of the CCM device 1 and of the anti-aircraft weapon system 20 can be done manually, or the triggering sequence thereof is controlled by a synchronization software module, or a combination thereof. Synchronization software module runs on the electronic control circuit 4 of the CCM device 1 or on an additional electronic circuit with processing, memory storage and communication possibilities, which is through the connection means 7, 7*a* connected to the electronic control circuit 4 and/or to the weapon electronic circuit 20*a*.

In embodiments where the air defense system comprises more than one CCM device 1, and the air defense system, i.e. the triggering sequence, is controlled by the synchronization software module, one of the CCM devices 1 and its electronic control circuit 4 is selected as a central electronic control circuit 4 on which the synchronization module is running and other electronic control circuits 4 are connected through the connection means 7 to the central electronic control circuit 4.

When triggering sequence of the CCM device 1 and of the anti-aircraft weapon system 20 is controlled by the synchronization software module the triggering may be based on sensor data mentioned above, for example counting of already released countermeasures 12, and/or combination thereof, received from the sensor subsystem 30.

The synchronization software module, according to preprogrammed algorithm, may have different threshold functions based on said parameters, that are either countable or probability based, e.g., if the counted number of flares is over the predefined threshold (e.g. 8 flares have been ejected) or that the probability is over predefined threshold (e.g. 70% that all flares have been ejected), in order to decide whether or not all flares have been released. Furthermore, threshold functions may change during operation of the CCM device 1, automatically or manually.

The CCM device 1 may be implemented for example as a man portable device, or a device mounted on a replica of MANPADS missile launcher, or a device mounted on a tripod, or similar supporting structure, or a device mounted on a ground, water or arial vehicles, or a device mounted on any type of 4×4, 6×6, 8×8 or tracked vehicle, or on ships and drones, or a device mounted on and/or integrated into remote controlled weapon station; whereas said vehicles may be manned or unmanned or possibly remotely-controlled.

When the CCM device 1 is implemented as a man portable device it is designed as a suitably shaped object that integrates device and is applicable to be carried by soldier, similar to assault rifle. When the CCM device is implemented as a standalone device, it can be mounted on a tripod or a similar support structure and can be tilted and rotated to cover wide range of elevation (pitch) and azimuth (yaw). When the CCM device 1 is implemented as a device mounted on remote controlled unmanned ground or arial vehicles including drones or any type of wheeled or tracked vehicle or on and/or integrated into remote controlled weapon station it is designed so that can be tilted and rotated to cover wide range of elevation (pitch) and azimuth (yaw) independent of the UAV or UGV or drone or vehicle or remote-controlled weapon station direction of motion.

When the CCM device 1 is part of the MANPADS (Man-portable Air-Defense System), preferably the device is attached to the MANPADS, so that after the anti-aircraft missile is launched, the CCM device can be disconnected or disengaged for further use with another MANPADS missile launcher. When the CCM device is part of other anti-aircraft weapon systems 20 as listed above, the device may be attached or integrated (built-in) to the anti-aircraft weapon systems 20, wherein integration should be done so that if for example a protection cover is used it should be for maximum efficiency essentially transparent to the emitted EM wavelength.

One of the advantages of integration of the CCM device 1 on the remote controlled weapon station is a more reliable assessment if all countermeasures 12 have already been released. Namely, RWS have multiple higher resolution cameras and capable optics operating in visual and IR spectrum and thus the number of already released countermeasures 12 can be assessed much more accurately.

Namely, it is usually difficult to determine exactly how many flares 12 have already been released and whether the majority or all flares 12 have been released. This information is very important in combat, as it can happen that if the aircraft 10 has not yet released all the flares 12, the real anti-aircraft missile 21 may miss the target, because the remaining flares 12 could successfully interfere with the real missile 21. Since flares 12 are usually released in bursts, this can be avoided by triggering the CCM device 1 until it is detected that the aircraft 10 is no longer releasing flares 12 or is releasing them in sporadic smaller bursts (e.g. only 2 vs 8 per side), and only then the real missile 21 is launched to increase the probability of target hit.

If a CCM device operator is located on a different geographical location, the triggering of the CCM device is done remotely via known technologies, such as wired e.g. copper or fiber, or wireless link, e.g. WiFi, LoRa, specific military link, directional microwave link or laser based communication link.

Remote operation is preferred when the CCM device is mounted on UAV or UGV or drone or tripod or RWS.

The air defense system of the proposed invention is used in combat, i.e. during anti-aircraft missions/engagements. The operating range of the proposed air defense system is up to 5 km, thus the present invention is therefore particularly suitable for low-flying aircrafts flying at altitudes up to 5 km and for helicopters.

An anti-aircraft combat method which is using the air defense system of the invention comprises the following steps:

- step A: emitting a simulated missile **3*b* or a sequence of simulated missiles 3*b* in a direction, frontally, sideways or at the rear of an aircraft 10 once the aircraft 10 is within an operating range of the CCM device 1**;
- step B: locking an anti-aircraft missile 21 onto the aircraft 10, i.e. the target, and launching the anti-aircraft missile 21 towards the aircraft 10.

Steps A and B are executed sequentially or partly or entirely simultaneously.

In one embodiment the method can include additional steps. Prior to emitting a simulated missile **3*b* or a sequence of simulated missiles 3*b*, an additional step of detecting and assessing information on the aircraft 10 by a sensor subsystem 30** may be done.

When it is determined that the countermeasures 12 are implemented as flares, prior to launching the anti-aircraft missile 21 towards the aircraft 10 an additional step of detecting if the aircraft 10 has released all countermeasures 12, i.e. the flares, by a sensor subsystem 30, thus providing feedback, and optionally providing information if or when to launch the real missiles 21.

When it is determined that the countermeasures 12 are implemented as directional infrared countermeasures, steps A and B are executed partly or entirely simultaneously.

Since the battlefield is usually of a larger geographical area, preferably several CCM devices 1 are placed and dispersed over said geographical area.

In a preferred embodiment, the CCM device 1 is located on a different location as the existing anti-aircraft weapon system 20 to avoid detection by the aircraft 10 more successfully.

One of the possible scenarios where the air defense system and method of the proposed invention is used where a MANPADS gunner and a CCM device operator act in unison targeting a single aircraft is presented on FIG. 1 and described below.

1. At least one soldier, i.e. a gunner is equipped with a MANPADS missile launcher 20. Usually, two soldiers act in unison targeting a single aircraft.
2. At least one device operator equipped with a man portable CCM device 1 is present on the battlefield at different location than the gunner with the MANPADS missile launcher 20. Preferably there are several device operators each equipped with the CCM device 1, suitably placed over larger geographical area where the aircrafts 10 are expected to come, cross, or operate.
3. The MANPADS gunner and the CCM device 1 operator acquire information on incoming aircraft 10 from radar operators, forward observers or they spot it themselves.
4. The MANPADS 20 gunner and the CCM device 1 operator coordinate their actions, with voice communication preferably with voice communication over a wireless communication network.
5. After the aircraft 10 is spotted by the device operator, he assesses the aircraft distance.
6. The MANPADS gunner also spots the aircraft 10 and aims with MANPADS 20 in ready to shoot position.
7. When the distance of the aircraft 10 is within the operating range of the CCM device 1 (e.g. 5 km), the device operator manually, through the trigger unit 5, selects the profile of the fake missiles **3*b* and presses the trigger on the CCM device 1**.
8. The EM sensor unit 3 emits EM radiation as if an anti-aircraft missile 21 was launched.
9. The MLWDS 11 onboard the aircraft 10 detects the emitted EM radiation and interprets it as a launched or in-flight anti-aircraft missile 21.
10. The pilot of the aircraft 10, or preset automatic control decides to release the flare countermeasures 12.
11. The device operator and the MANPADS gunner observe the flare 12 release from the aircraft 10.
12. The device operator may again press the trigger 5 on the CCM device 1 to further emit EM radiation as if another anti-aircraft missile 21 was launched or is in flight.
13. The steps 5.-12. may be repeated several times.
14. The device operator or the MANPADS gunner assesses if the aircraft 10 has released or even exhausted all flares 12.
15. The MANPADS gunner activates the MANPADS missile 21. Alternatively, this step can already be performed after first flares 12 release. This depends on tactical situation (e.g. aircraft speed, missile 21 setup time).
16. The MANPADS gunner aims at the aircraft 10 and assures that the missile 21 is locked onto the target, i.e. the aircraft 10.
17. The MANPADS gunner triggers the anti-aircraft missile 21 launch.
18. The anti-aircraft missile 21 is ejected from the launch tube and heads towards the aircraft 10.

19. The aircraft 10 is hit by the missile 21.

One of the possible scenarios where the air defense system and method of the proposed invention is used in automatic manner is presented on FIG. 2 and described below.

1. At least one (V)SHORAD missile launcher 20 with a single or multiple anti-aircraft missiles 21 and with an embedded weapon electronic circuit 20*a* which is through a connection means 7, 7*a* connected to the electronic control circuit 4 of the CCM device 1 is placed on a mobile platform (usually 4×4 or 6×6).
2. At least one CCM device 1 is present on the battlefield at different location than the missile launcher 20. Preferably there are many such CCM devices 1, suitably placed over larger geographical area where the aircrafts 10 are expected to come, cross, or operate, wherein electronic control circuit 4 of one CCM device 1 is selected as a central electronic control circuit 4 on which the synchronization software module is running and other electronic control circuits 4 are connected through the connection means 7 to the central electronic control circuit 4.
3. Information on incoming aircraft 10 is acquired by a sensor subsystem 30 comprising IR camera wherein said sensor subsystem 30 is located on the CCM device 1. For example, the following information is extracted: the aircraft distance, velocity, direction, and estimated trajectory. Optionally, the aircraft type and model are assessed.
4. When the distance of the aircraft 10 is within the operating range of the CCM device 1 (e.g. 5 km), the synchronization software module which runs on the electronic control circuit 4 triggers the CCM device 1.
5. The EM sensor unit 3 emits EM radiation as if an anti-aircraft missile 21 was launched.
6. The MLWDS 11 onboard the aircraft 10 detects the emitted EM radiation and interprets it as a launched or in flight anti-aircraft missile 21.
7. The pilot of the aircraft 10 or preset automatic countermeasures control decides to release the flare countermeasures 12.
8. Detection of the flare 12 release and counting of the ejected flares 12 is done by the sensor subsystem 30 located on CCM device 1 and is communicated to the synchronization software module.
9. Possible further triggering of the CCM device 1 is done by the synchronization software. Decision on further triggering is based for example on the number of detected flares 12 from all previous ejections from the same aircraft 10 and on the type and model of the aircraft 10.
10. The steps 4.-9. may be repeated several times.
11. The synchronization software module according to the preprogrammed algorithm assesses whether the aircraft 10 has released or even exhausted all flares 12.
12. When the synchronization software module assesses that all flares 12 have been released, the corresponding trigger activation signal is communicated to the (V)SHORAD missile launch system 20. If the anti-aircraft missile 21 is already locked onto the aircraft 10, the trigger activation signal triggers the launching of the missile 21. If the anti-aircraft missile 21 is not locked onto the aircraft 10, trigger activation signal triggers locking and subsequent launching of the missile 21 is activated automatically by locking the anti-aircraft missile 21 onto the aircraft 10, i.e. the target, and launching the anti-aircraft missile 21 towards the aircraft 10.
13. One or several missiles 21 are launched from launch tubes and headed toward the aircraft 10.
14. The aircraft 10 is hit by the missile 21.

On FIG. 4 a flowchart of one the possible air defense system operation and method is presented.

1. SETUP—presence of at least one CCM device 1 and the (V)SHORAD system 20.
2. ESTABLISH—the communication link between the CCM device 1 and the (V)SHORAD system 20, and between the CCM device 1 and the control center is established.
3. The CCM device 1 is operated remotely or autonomously.
4. MISSION ACTIVITY—detection and classification of the target (i.e. information about the aircraft 10).
5. EM WAVE EMISSION-based on acquired information, triggering of the CCM device 1, and emitting the corresponding profile(s) of the simulated missiles 3*b*.
6. OBSERVATION-detection of the flare 12 release and counting of the ejected flares 12.
7. Steps 5 and 6 may be repeated, usually until all flares 12 have been ejected.
8. (V)SHORAD LAUNCH DECISION—signaling to (V)SHORAD system 20 to launch
9. (V)SHORAD MISSILE LAUNCH—launching of the anti-aircraft missile 21.

While the invention is disclosed in conjunction with a description of certain embodiments, including those that are currently the preferred embodiments, the detailed description is intended to be illustrative and should not be understood to limit the scope of the present disclosure. As would be understood by one of ordinary skill in the art, embodiments other than those described in detail herein are encompassed by the present invention. Modifications and variations of the described embodiments may be made without departing from the spirit and scope of the invention.

The invention claimed is:

1. An air defense system configured for anti-aircraft combat, wherein said system is comprised of:

at least one counter countermeasures device 1 configured for generating and emitting simulated missiles 3*b*, with electromagnetic (EM) radiation of wavelengths that mimics real anti-aircraft missiles 21, which are detected by an anti-aircraft missile warning and detection system 11 installed on an aircraft 10 and at least one anti-aircraft weapon system 20 with embedded weapon electronic circuit 20*a*, and configured for launching at least one anti-aircraft missile 21, and a sensor subsystem 30 located on the counter countermeasures device 1 and configured for detecting and acquiring information about the aircraft 10 before generating and emitting simulated missiles 3*b*;

wherein said counter countermeasures device 1 is configured as a standalone hand-held device, or configured to be attached to the anti-aircraft weapon system 20 via a mounting rail, or integrated into a vehicle housing the anti-aircraft weapon system 20, and wherein emitting of simulated missiles 3*b* and launching of anti-aircraft missiles 21 are coordinated such that the counter countermeasures device 1 emits the EM radiation for a first duration to elicit a spoofing of a missile warning alarm on the aircraft 10 prior to the anti-aircraft weapon system 20 firing the anti-aircraft missile 21.

2. The air defense system according to claim 1, wherein the counter countermeasures device 1 comprises an EM source unit 3, an electronic control circuit 4 with processing, memory, and circuitry for driving the EM source unit 3, a trigger unit 5, and a power unit 6, wherein the EM source unit 3 comprises at least one EM source 3*a* and is configured for emitting simulated missiles 3*b* defined by a plurality of simulated missiles, wherein each simulated missile 3*b* is defined by a profile which comprises duration, wavelength and intensity of EM radiation emitted by EM source unit 3, wherein the trigger unit 5 is configured for selecting the profile of the simulated missile 3*b* or a sequence thereof, and for activating the EM source unit 3 of the counter countermeasures device 1 and wherein the electronic control circuit 4 is configured for driving the EM source unit 3, for storing the profiles of simulated missiles 3*b* and sequences thereof in a memory, for receiving an input from the trigger unit 5 and for running a counter countermeasures software module which operates the counter countermeasures device 1.

3. The air defense system according to claim 1, wherein the electronic control circuit 4 has connection means 7 for enabling a wired or wireless connection between the electronic control circuit 4 and an external computer for programming the electronic control circuit 4, the programming including uploading, modifying, and updating the profiles of the simulated missiles 3*b*.

4. The air defense system according to claim 1, wherein the counter countermeasures device 1 comprises an EM source unit 3 comprising multiple EM sources 3*a* emitting light of the same wavelength or emitting light of different wavelengths operating simultaneously and/or with a time shifted difference, and wherein the EM sources 3*a* are arranged in arrays, each individual array emitting light of the same wavelength or emitting light of different wavelengths.

5. The air defense system according to claim 1, wherein the EM source unit 3 is configured for emitting UV light in solar blind region, and/or IR light in short wave region -SWIR, or medium wave region-MWIR, and/or laser light in IR region-SWIR region, or UV light in solar blind region.

6. The air defense system according to claim 1, wherein the counter countermeasures device 1 additionally comprises a mechanical or optical sight 8 installed on top or side position of an enclosure 2 into which the counter countermeasures device 1 is installed.

7. The air defense system according to claim 1, wherein the counter countermeasures device 1 additionally comprises an attachment harness 9 for attachment of the device 1 onto the anti-aircraft weapon systems 20 when configured to be attached to the anti-aircraft weapon system 20 via the mounting rail.

8. The air defense system according to claim 1, wherein the anti-aircraft weapon system 20 additionally comprises a weapon connection means 7*a* configured for connecting the weapon electronic circuit 20*a* with the electronic control circuit 4 on the counter countermeasures device 1.

9. The air defense system according to claim 1, wherein the air defense system additionally includes a sensor subsystem 30 configured for detecting and acquiring information about the aircraft 10, and/or for detecting, analyzing, and recording or counting ejected flares 12, and/or for sensing of IR lasers emitted from directional infrared countermeasures systems on the aircraft 10.

10. The air defense system according to claim 9, wherein the sensor subsystem 30 is located on the counter countermeasures device 1.

11. The air defense system according to claim 1, wherein the counter countermeasures device 1 is located proximate to the anti-aircraft weapon system 20, or the counter countermeasures device 1 is located at a remote location relative to the anti-aircraft weapon system 20.

12. The air defense system according to claim 1, wherein a triggering sequence of the counter countermeasures device 1 and of the anti-aircraft weapon system 20 is done manually, or when the counter countermeasures device 1 at a remote location relative to the anti-aircraft weapon system 20, the triggering of the counter countermeasures device 1 and of the anti-aircraft weapon system 20 is done remotely via wired or wireless communication using at least one of the group consisting of copper, WiFi, LoRa, specific military link, directional microwave link or laser based communication link.

13. The air defense system according to claim 1, wherein the triggering sequence of the counter countermeasures device 1 and of the anti-aircraft weapon system 20 is controlled by a synchronization software module, wherein said synchronization software module runs on the electronic control circuit 4 of the counter countermeasures device 1 or on an additional electronic circuit with processing, memory storage and communication possibilities, wherein the additional electronic circuit is through the connection means 7, 7*a* connected to the electronic control circuit 4 and/or to the weapon electronic circuit 20*a*.

14. An anti-aircraft combat method comprising the air defense system according to claim 1, wherein the method comprises:

step A: emitting a simulated missile 3*b* or a sequence of simulated missiles 3*b* in a direction, frontally, sideways or at the rear of an aircraft 10 once the aircraft 10 is within an operating range of the counter countermeasures device 1;

step B: locking an anti-aircraft missile 21 onto the aircraft 10 and launching the anti-aircraft missile 21 towards the aircraft 10.

15. The anti-aircraft combat method according to claim 14, wherein the method further includes a step of detecting and assessing information about the aircraft 10 by a sensor subsystem 30, wherein said step is performed prior to step A.

16. The anti-aircraft combat method according to claim 14, wherein step B follows step A.

17. The anti-aircraft combat method according to claim 14, wherein step A and step B are at least partly simultaneous.

18. The anti-aircraft combat method according to claim 16, wherein the method further includes a step of detecting if the aircraft 10 has released countermeasures 12 by a sensor subsystem 30, wherein said step is executed prior to step B.

* * * * *